April 19, 1966     R. C. DEMI     3,246,596
AUTOMATIC "RANGE TOP" COFFEE MAKER
Filed July 16, 1963     2 Sheets-Sheet 1

INVENTOR
ROY C. DEMI
BY Thomas L. Kuban
ATTORNEY

April 19, 1966    R. C. DEMI    3,246,596
AUTOMATIC "RANGE TOP" COFFEE MAKER
Filed July 16, 1963    2 Sheets-Sheet 2
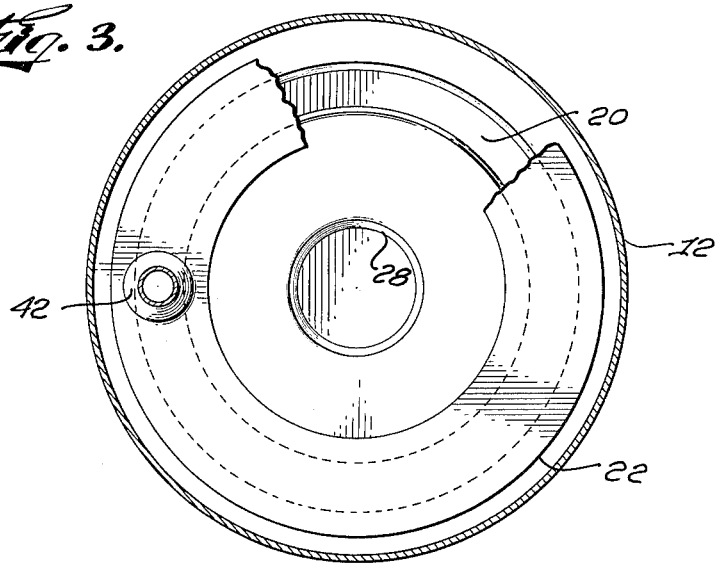
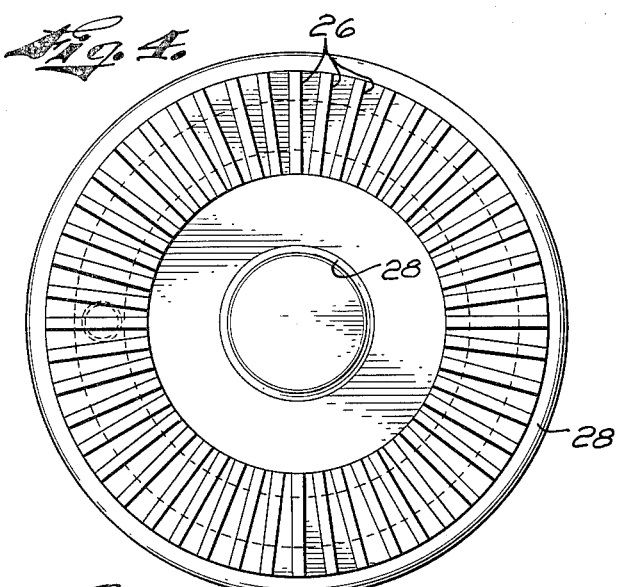
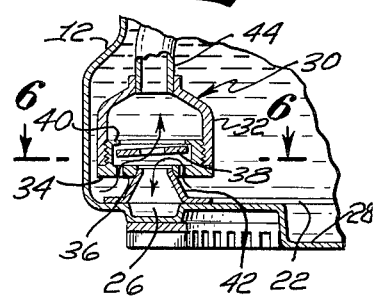
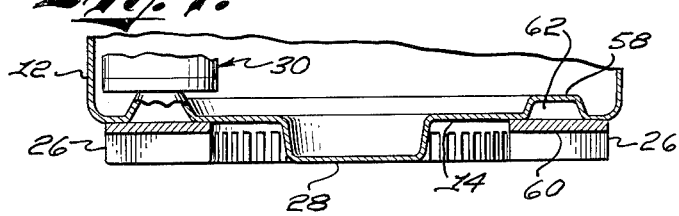
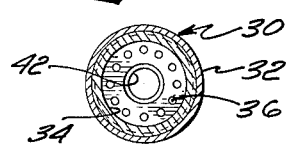
INVENTOR
ROY C. DEMI
By Thomas L. Kulaw
ATTORNEY

United States Patent Office 3,246,596
Patented Apr. 19, 1966

3,246,596
AUTOMATIC "RANGE TOP" COFFEE MAKER
Roy C. Demi, Greensburg, Pa., assignor to Robertshaw Controls Company, a corporation of Delaware
Filed July 16, 1963, Ser. No. 295,356
5 Claims. (Cl. 99—310)

This invention relates to a beverage maker and more particularly to a beverage maker of the percolator type which will automatically percolate a beverage on a gas range.

It is well known in the art for the percolation of such beverages as coffee, that a liquid pump or percolator comprises a well or closed heated boiling chamber that communicates with a basket containing ground coffee beans through a hollow stem.

It is customary to use the state of the art percolator by charging it with the proper amount of water and coffee grounds and thereafter placing it upon a source of heat such as a gas or electric range or heating plate of some sort. The water within the percolator must be brought to a boil in order for the percolator pump to spew the boiled water over the coffee grounds. It usually requires approximately one minute for each cup of water used to reach a temperature where percolation begins, and thereafter takes approximately six to ten minutes of percolation for the coffee to be brewed to a desired strength. For individuals who wish to have coffee of a particular consistency or strength, the time for percolation must be timed very accurately and thereafter the source of heat be completely removed or the amount of heat reduced to a point where the temperature of the brewed coffee will remain hot without further percolation. The amount of heat added to the percolator must be high enough to maintain percolation but yet low enough to prevent boilover, and therefore this choice is very critical as to both the amount of heat added and the time for which it is added.

Currently there is marketed control mechanisms which regulate the heat output for gas ranges. In use of such a control, a cooking vessel could be rapidly heated initially to a predetermined temperature and thereafter a reduced amount of heat input is introduced to maintain a predetermined temperature set on the control. The control has a thermostat positioned adjacent to the cooking vessel to sense its temperature for purposes of modulating the amount of energy applying to the gas burner. The ordinary percolator known in the art could not be automatically operated on such a temperature control for a cooking range because the percolation could not be arrested once it had started.

The ordinary percolator will only commence boiling when some portion of the water contained in the vessel is raised to 212° F., under ordinary conditions. In the event the present percolator were used on a gas range equipped with a temperature control set at a temperature less than 212° F., the percolation would commence and theoretically not cease, and therefore this type of temperature control cannot automatically control a conventional percolator.

In accordance with my present invention I have eliminated much of the disadvantages of the current type of "range top" percolator, and provide an arrangement within a percolator whereby the beverage being percolated is brewed automatically such that no attention need be paid to it during the brewing time.

In accordance with the feature of my invention, I provide a percolator vessel with a boiling chamber arrangement which will rapidly percolate after heat is applied to the bottom of the vessel. In this manner, the time for percolation is markedly reduced.

Then another feature of the present invention is an arrangement of the percolating pump whereby heat may be applied to particular portions of the vessel bottom to enable percolation to occur, and apply a limited amount of heat to other portions of the vessel bottom to keep the brewed beverage within the vessel at a predetermined temperature.

Yet another feature of my invention is a structure which will allow a thermostatically controlled heating element to quickly elevate the temperature of water within the percolator vessel to allow percolation to occur, and thereafter to allow the amount of heat to be reduced to keep the water within the vessel at a constant temperature.

Still another feature of the present invention is an arrangement of a percolator vessel which may be operated automatically by temperature controlled heating elements on "range tops" or may be operated as a conventional percolator.

Other features and advantages of this invention will become apparent from the following detailed description on the accompanying drawings of which:

FIGURE 3 is a cross-sectional view taken along line 3—3 of the FIGURE 2 with a part broken away;

FIGURE 4 is a view looking at the bottom of the percolator taken along line 4—4 in FIGURE 2 and showing the heat exchanger which may be placed upon the underside of the percolator;

FIGURE 5 is a partial view of the pump portion of FIGURE 2, showing action of the water re-entering the percolator pump;

FIGURE 6 is a cross-sectional view of the percolator pump taken along line 6—6 of FIGURE 5;

FIGURE 7 is a partial vertical cross-sectional view of the percolator showing an alternate construction of the boiling chamber.

Figure 2:
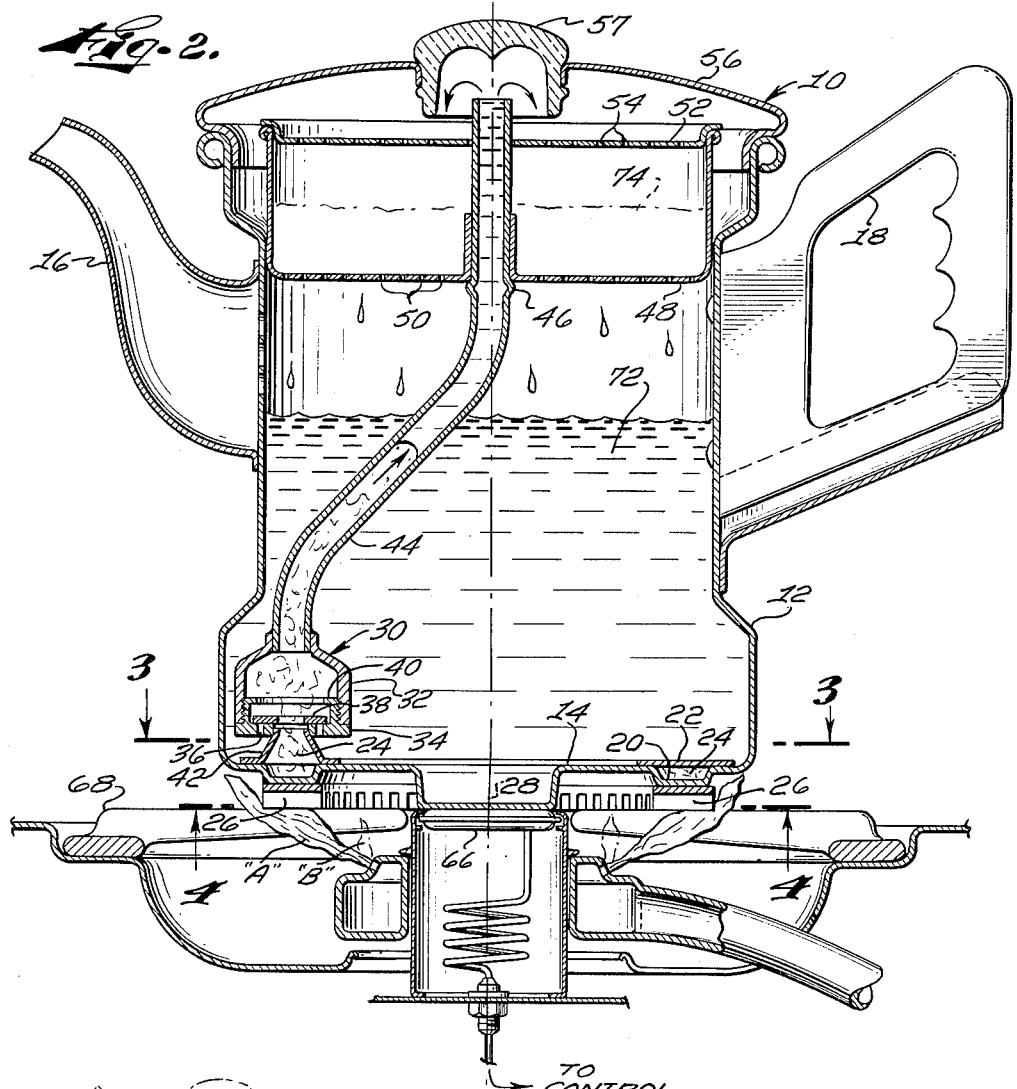
FIGURE 2 is a vertical cross-sectional view of a percolator constructed in accordance with the present invention placed in cooking relation with the thermostatic control operating upon a gas range.

With reference now to the drawings, FIGURE 2 shows a percolator or cooking vessel 10 constructed according to the present invention. The percolator comprises an open top vessel or chamber 12 having a bottom wall 14 thereon, and fitted with a conventional pouring spout 16 and handle 18. The particular shape of the vessel 10 may be formed in such a manner to appeal to esthetic taste and is not limited to the particular shape illustrated since the particular shape is not part of the present invention.

A means for retaining a fluid in a localized area is formed in the bottom wall 14 of the vessel. One such means in the present embodiment is shown as an annulus shaped recess 20 formed in the bottom wall of the vessel. A sealing ring 22 is fixedly mounted on opposite sides of the annulus shaped recess 20 and attached to the bottom wall of the vessel. In this manner, a closed or boiling chamber 24 is formed which may be filled with the liquid to be percolated to form a boiling chamber. A series of heat exchanger fins 26 are either integrally formed or fixedly attached to the underside of the vessel bottom wall 14 and are arranged in an annulus shape adjacent to the boiling chamber 24 such that heat might be concentrated at the boiling chamber when exposed to an external heat source.

The bottom wall 14 of the vessel 12 has a circular recess 28 formed in its central portion to provide a surface at a common plane with the bottom of the fins 26. The recess 28 may be used for purposes of sensing the temperature of the water within the vessel itself.

A means for refilling the boiling chamber 24 is provided within the vessel and includes a valve device 30 shown in FIGURES 2, 5, and 6, having a check valve therein used to allow liquid to pass in one direction only. The refilling means may include a casing 32 having a valve cap 34 threaded thereon which has a plurality of apertures 36 therethrough for allowing liquid within the casing 32. A valve disc 38 approximately the same size as the interior of the valve cap 34 covers the apertures 36 and is retained within a limited amount of vertical movement by a return flange 40 formed in the valve cap 34. A frusto-conical shaped tube 42 is positioned and mounted between the valve cap 34 and the sealing ring 22.

A stem 44 is fixedly attached to the upper portion of the casing 32 and extends to the vertical axis of the vessel 12 toward its upper portion. An annular bead 46 formed in the stem 44 supports a basket 48 used for retaining the makings of the beverage. This basket includes a plurality of perforations 50 at its bottom to allow leachings of the coffee grounds contained within the basket to pass therethrough. A top 52 slidably mounted over the stem 44 and resting upon the top portion of the basket 48 also has a plurality of perforations 54 therethrough such that heated water passing upwardly through the stem will be diverted upon the basket top 52 and flow through the contents of the basket 48 back to the interior of the vessel 12 which is typical in many types of well known percolators.

A conventional cover 56 snugly fits the top of the open vessel 12 and preferably has a transparent knob 57 which may be viewed to determine whether percolating has occurred and the color of the particular beverage being percolated.

Another embodiment of the boiling chamber is illustrated in FIGURE 7. In this embodiment, a recess 58 is formed upwardly in the bottom wall 14 of the vessel 12 such that the vessel might be formed with a minimum of parts and the simplest of manufacturing processes. A flat plate 60 is fixedly attached to the bottom wall 14 of the vessel covering the recess 58 and forming a boiling chamber 62 therein, similar to the particular configuration shown in FIGURE 1. It is noted that heat exchanger fins 26 need not be placed at the bottom wall 14 of the vessel 12 nor is a particular configuration required for the particular invention to operate satisfactorily.

Figure 1:
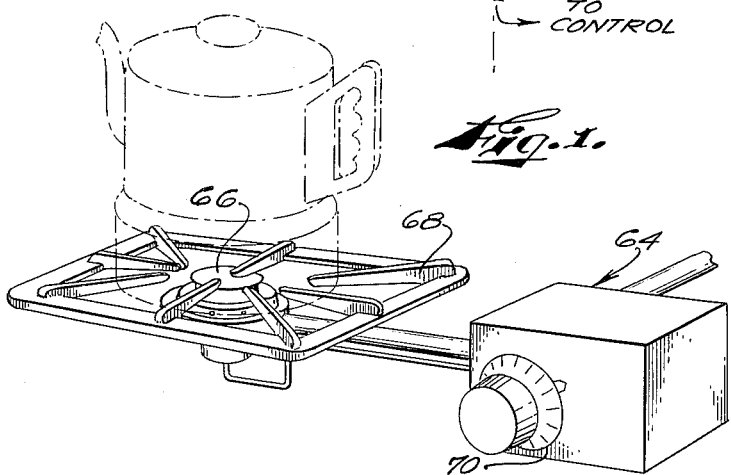
FIGURE 1 is a perspective schematic view of a thermostatic control for cooking ranges with the present invention placed upon the range top.

The present invention is best operated with a control mechanism, FIGURES 1 and 2, for regulating the amount of heat output of a heating unit such as a top burner of a gas or electric range. Such a heating system is only schematically illustrated in FIGURE 1 since such a system is not a part of the present invention, but helps the present invention operate automatically. Such a control device for a gas range is illustrated and explained in the U.S. Patent to Weber 2,885,151 and a similar device for electric range burners is illustrated and described in the U.S. patent to Weber et al. 2,902,567 and assigned to the same assignee as this invention. While these automatic range controls are but two of particular types of automatic devices, there are many control devices out on the market today and the present invention will operate automatically on such devices equally as well.

A great majority of these control devices 64 include a sensing head 66 for sensing the temperature of the vessel 10 placed upon the burner grate 68 and in accordance with a temperature set at a dial 70 on the front of the range; the device 64 will modulate the amount of heat applied to the underface of the vessel 10. In the case of a gas range, the gas flames are at first quite extended as shown in FIGURE 2 at position "A," until the sensing element senses a temperature corresponding to that set at the control dial, and thereafter the flames retract to position "B" in an attempt to keep the contents of the vessel at the temperature of the dial setting.

To place the present invention into operation, the vessel 12 must be filled with the proper amount of water 72 and the basket 48 charged with ground coffee beans 74 in a manner corresponding to the conventional art of coffee making. The basket lid 52 and the vessel cap 56 are replaced and the percolator 10 is centrally located over the sensing element 66 of the thermostatically controlled device 64 upon the range top. The sensing element 66 is then in contact with the bottom wall of recess 28 of the vessel 12 and should sense the heat of the adjacent contents of the percolator 10.

The control dial 70 is set to approximately 180° F., which has been considered by some experts to be the average serving temperature for coffee, however, this temperature can be varied in accordance with the particular strength of coffee desired by the individual making it. It may be seen that by adjustment of the temperature, the automatic thermostatic control device 64 will actually be a timer for the length of percolation. The sensing element 66 determines that the temperature of the bottom wall 14 of the vessel and the contents therein is far below the temperature setting on the control dial 70, a maximum amount of heat is applied to the bottom of the vessel and in the case of a gas range, the flames assume position "A" and impinge the area of the vessel adjacent to the boiling chamber 24, FIGURE 2. The water within the boiling chamber 24 is trapped therein until it may be forced outwardly by steam being generated within the chamber 24. Heat is conveyed through the heat exchanger fins 26, and the bottom of the wall of the vessel 10 by conduction, applying the great majority of heat to the boiling chamber 24. In this manner, bubbles of steam form which constantly expand, forcing the water above the steam up through the frusto-conical tube 42 and the stem 44, finally being emitted from the open end impinging on the underside of knob 57 and falling upon the perforated top 52 of the basket 48. As is well known in the art, the water will leach the soluble constituents from the coffee bean grounds within the basket 48 and drip within the vessel 12.

At the expulsion of the water within the boiling chamber 24, a pressure differential exists between the interior of casing 32 and the interior of the vessel 12. The weight of the water within the vessel 12 will force the valve disc 38 upwardly as shown in FIGURE 5, allowing water to drain within the casing 32 and into the boiling chamber 24 and upward into stem 44 until the pressure is completely balanced. The valve disc 38 will then fall by gravity to close off the aperture 36 and another percolation cycle will begin.

As percolation progresses, the temperature of the water within the vessel 12 will increase gradually until it approaches the temperature set on a control dial 70. This temperature is sensed by the sensing element 66 of the thermostatically controlled device that modulates the amount of heat applied to the underside of the vessel 12 to a lower rate to maintain the preset dial temperature. The thermostatic control would then throttle back from a full burner rate to a slower rate or position "B" as illustrated in FIGURE 2, to maintain the preset dial temperature. As this occurs, the flame reduces in diameter and is not in proximity of the boiling chamber 24 and hence the heat that is applied to the vessel 12 does not promote percolation since the gas flames are in spaced relation with the boiling chamber 24. As long as the percolator 10 remains upon the automatic gas burner, the temperature of the coffee will remain at the setting of the control dial of the thermostatic device. At the leisure of the coffee drinkers, the percolator may then be removed from the burner and served as desired and replaced upon the range wherein the coffee will be kept at the desired temperature. It should be noted that once the interior of the vessel 12 drops in temperature such that a sensing element 66 causes the automatic control device 64 to increase the diameter of the flames to position "A." percolation will again start which is not the desired mode of operation.

While in the foregoing specification embodiments of the invention have been set out in considerable detail for purposes of illustration, it will be apparent to those skilled in the art that considerable change such as the specific configuration of the boiling chamber, the valve and other details may be made without departing from the spirit of the present invention.

I claim:
1. In a percolator for use on a heating range, the combination comprising
   a vessel having a bottom wall defining a heating chamber adapted to receive a liquid,
   said bottom wall having a recessed portion extending completely around said bottom wall and being disposed adjacent its periphery,
   means for substantially sealing said recessed portion from the heating chamber to define a boiling chamber,
   a valve casing carried by said sealing means and having inlet means and outlet means,
   a percolator tube having an upper end communicating with the heating chamber and a lower end communicating with said casing outlet means,
   said casing inlet means having first port means communicating with the heating chamber and second port means communicating with the boiling chamber, and
   one-way check valve means in said valve casing controlling said first port means and being operable to open the same whenever a pressure from the heating chamber is greater than a pressure from the casing.
2. The combination as recited in claim 1 wherein said recessed portion has an annular configuration.
3. The combination as recited in claim 2 wherein said recessed portion is provided with a plurality of external fins to facilitate heat exchange thereto.
4. The combination as recited in claim 1 wherein said valve casing includes a bottom cap member having a central aperture defining said second port means and a plurality of peripheral apertures defining said first port means.
5. The combination as recited in claim 4 wherein said valve casing includes an internal flange member spaced from said bottom cap member, and said check valve means includes a valve disc movable between said flange member and said bottom cap member, said valve disc having a central opening aligned with the central aperture of said bottom cap member and a peripheral portion for closing the peripheral apertures in said bottom cap member.

References Cited by the Examiner

UNITED STATES PATENTS

| 226,611 | 4/1880 | Heap | 99—308 |
|---|---|---|---|
| 582,188 | 5/1897 | Dunlap | 99—312 |
| 956,481 | 4/1910 | Chapman. | |
| 1,047,402 | 12/1912 | Gefter | 99—310 |
| 1,095,973 | 5/1914 | Wojidkow | 103—231.5 |
| 1,235,791 | 8/1917 | Gebhardt et al. | 99—308 X |
| 1,541,418 | 6/1925 | Koenig | 103—231.5 |
| 2,485,247 | 10/1949 | Wahl | 99—310 X |
| 3,068,777 | 12/1962 | Pedalino | 99—312 X |
| 3,081,709 | 3/1963 | Dombrowik | 99—310 X |

FOREIGN PATENTS

| 385,667 | 12/1923 | Germany. |
|---|---|---|

WALTER A. SCHEEL, *Primary Examiner.*

LEONARD W. VARNER, ROBERT E. PULFREY,
*Examiners.*